July 2, 1957  J. C. BONNEAU ET AL  2,797,564
ADJUSTABLE TORQUE TOOL
Filed Aug. 11, 1954
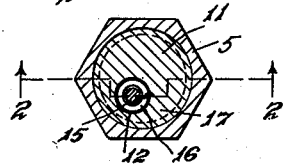
Fig. 1.
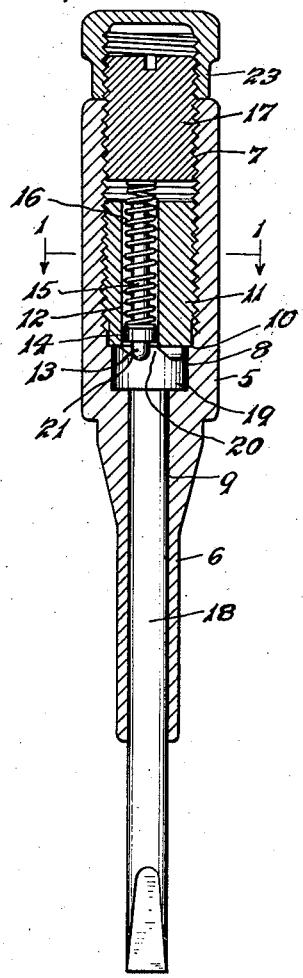
Fig. 2.
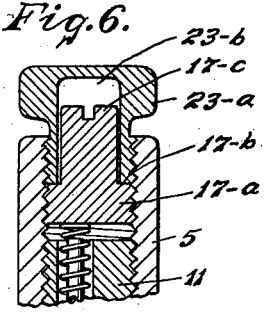
Fig. 6.
Fig. 3.
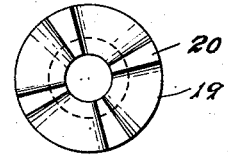
Fig. 4.
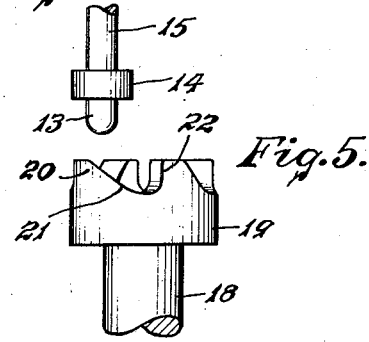
Fig. 5.
INVENTOR.
CELESTE E. MALCHIODI.
BY JOSEPH C. BONNEAU.
Louis V. Lucia
ATTORNEY.

United States Patent Office 2,797,564
Patented July 2, 1957

2,797,564

ADJUSTABLE TORQUE TOOL

Joseph C. Bonneau, East Hampton, and Celeste E. Malchiodi, West Hartford, Conn.

Application August 11, 1954, Serial No. 449,241

5 Claims. (Cl. 64—29)

This invention relates to an adjustable torque tool and more particularly to such a tool in which the torque applied therethrough for turning a member in one direction may be regulated so as to prevent tightening of a screw, or nut, beyond a certain predetermined limit.

A further object is to provide such a tool which can be adjusted to vary the torque that may be applied therethrough.

Further objects and advantages will be more clearly understood from the following description and accompanying drawings in which:

Fig. 1 is a sectional plan view on line 1—1 of Fig. 2.

Fig. 2 is a side view, partly in central vertical section on line 2—2 of Fig. 1, of a screwdriver embodying the present invention.

Fig. 3 is a plan view of the ratchet member in said tool.

Fig. 4 is an enlarged side view of the pawl member used in said tool.

Fig. 5 is an enlarged side view of the ratchet member.

Fig. 6 is a sectional side view showing a modified form of the invention.

In the embodiment illustrated, the numeral 5 denotes the handle of the tool and 6 denotes a shank supporting portion which extends therefrom.

The said handle 5 has a threaded axial recess 7 connecting with a co-axial reduced portion 8 of said recess which connects with an axial bore 9 in the shank portion 6. An annular shoulder 10 is provided between the portions 7 and 8 of the axial recess in said handle.

A backing screw 11 is threaded to the wall of the recess 7 and has a longitudinal bore 12 therein which slidably contains a pawl pin 13 that has a collar 14 and a stem 15 over which there is mounted a thrust spring 16 which is seated against the said collar 14 and projects above the top of the backing screw 11.

An adjusting screw 17 is also threaded to the side walls of the recess 7 and anchors the upper end of the spring 16.

A shank 18 is rotatably contained within the bore 9 and has at its upper end a ratchet head 19 with an annular row of ratchet teeth 20 therein which are adapted to be engaged by the bore 13. The said teeth are provided with cam surfaces 21 extending towards one side thereof and with abrupt walls 22 at their opposite sides.

It will be noted that the ratchet head 19 is of a height substantially equal to or slightly less than the depth of the recess portion 8 so that the end of the backing screw 11 will abut the annular shoulder 10 and permit tightening of said screw into position while allowing for sufficient clearance to permit rotation of the head 20 in said recess portion.

In order to lock the adjusting screw 17 into adjusted position, the said screw is extended out of the end of the recess 7 and there is provided a lock nut in the shape of a cap 23 which is threaded to the extended end of the said adjusting screw and abuts the end of the handle portion 5.

In the modified form shown in Fig. 6, the adjusting screw 17-a has a shoulder 17-b and a reduced head portion 17-c.

The lock nut 23-a is threaded to the same thread 7 as the adjusting screw and has a recess 23-b which receives the head 17-c. The end of said nut 23-a engages the shoulder 17-b to lock the adjusting screw in adjusted position.

The operation of my improved adjustable torque tool is as follows:

The desired amount of torque allowed for turning a screw or nut is obtained by first rotating the screw 17 to vary the pressure of the spring 16 upon the pawl 13 and thereby varying the amount of pressure which is applied by the said pawl onto the ratchet teeth 20 and the torque that is required to cause the pawl 13 to slide up the cam surfaces 21 and thereby limit the amount of torque that can be applied upon the shank 18 by rotation of the handle portion 5.

When the tool is used for rotating a screw or nut, the handle is turned until the shank 18 stops turning and the proper amount of torque will then have been applied. Further rotation of the handle will not rotate the shank 18 but will merely cause escapement between the teeth 20 and the pawl 13.

The straight wall portion 22 of said teeth will provide a positive connection between the said shank and handle so as to permit turning of the screw or nut in a left hand direction when it is desired to loosen the said screw or nut and no limit to the torque applied thereto in that direction is wanted.

It will be noted from Fig. 1 that the end of the pawl 13 is semi-spherical so that it will properly engage with the teeth 22 in any position and that the axis of the said pawl is off-center with relation to the axis of said teeth so that the said pawl will be located in proper relation to the teeth.

We claim:

1. An adjustable torque tool including a handle having a shank bearing portion, the said handle having an axial threaded recess therein, a reduced portion at the bottom of said threaded recess and an axial bore extending from said reduced recess through the said shank bearing portion, a shank rotatably mounted in said bore and extending from the shank bearing portion of the handle, a ratchet head on said shank rotatable in the reduced recess portion, an annular row of teeth upon the end of said head, a backing screw member threaded to the wall of the said axial recess in the handle and engageable with said head for preventing longitudinal movement of the shank, the said screw having an off-center longitudinal bore extending therethrough, a pawl slidable in said off-center bore and extending from said backing screw into contact with the ratchet teeth on said head, a spring urging the pawl into said contact, and an adjusting screw also threaded to the wall of the recess in the handle and adjustable longitudinally therein for varying the pressure of the spring member against the pawl.

2. An adjustable torque tool including a handle portion having an axial threaded recess therein with an internal thread in the wall thereof, a reduced portion at the bottom of said recess providing an annular shoulder surrounding the top of said reduced portion, and an axial bore continuing from the bottom of said reduced portion through the said handle, a shank rotatably mounted in said bore and having a head rotatably contained within the reduced recess portion and a plurality of annularly disposed ratchet teeth in the top of said head, a backing screw threaded to the said internal thread and engaging the said annular shoulder, the said backing screw having a longitudinal bore extending therethrough off-center relatively to the axes of said screw, a pawl slidable in said bore of the screw and extending from the bottom of said screw into engagement with the said ratchet teeth, a spring member in said bore of the screw urging the pawl in said contact with the ratchet teeth, an adjusting screw also threaded to the said internal thread and adapted for varying the pressure of said spring upon the pawl, the said adjusting screw extending beyond the upper end of the handle portion, and a locking nut threaded to the said extending portion of the adjusting screw and abutting the end of the handle for locking the said adjusting screw in adjusted position.

3. An adjustable torque tool including a handle portion having an axial recess therein, an internal thread on the wall of said recess, a reduced recess portion at the bottom of said threaded recess providing an annular shoulder surrounding the top of said recess portion, and an axial bore continuing from the bottom of said reduced portion through the said handle, a shank rotatably mounted in said bore and having a head rotatably contained within the reduced recess portion and a plurality of annularly disposed ratchet teeth in the top of said head, a backing screw threaded to the said internal thread and engaging the said annular shoulder, the said backing screw having a longitudinal bore extending therethrough off-center relatively to the axes of said screw, a pawl slidable in said bore of the screw and extending from the bottom of said screw into engagement with the said ratchet teeth, a spring member in said bore of the screw urging the pawl into contact with the ratchet teeth and extending above the upper end of the screw, an adjusting screw also threaded to the said internal thread and engaging the projecting end of the said spring for varying the pressure thereof upon the pawl, the said adjusting screw extending beyond the upper end of the handle portion, and a locking nut between said adjusting screw and handle.

4. An adjustable torque tool as set forth in claim 3 wherein the adjusting screw has an annular shoulder and a reduced head portion which extends beyond the end of the handle and the lock nut is also threaded to the said internal thread and engages the said shoulder to lock the adjusting screw in adjusted position and has a recess which receives the said head portion.

5. An adjustable torque tool including a handle portion having an axial recess therein, an internal thread on the wall of said recess, a reduced recess portion at the bottom of said threaded recess providing an annular shoulder surrounding the top of said recess portion, and an axial bore continuing from the bottom of said reduced portion through the said handle, a shank rotatably mounted in said bore and having a head rotatably contained within the reduced recess portion and a plurality of annularly disposed ratchet teeth in the top of said head, a backing screw threaded to the said internal thread and engaging the said annular shoulder, the said backing screw having a longitudinal bore extending therethrough off-center relatively to the axes of said screw, a pawl slidable in said bore of the screw and extending from the bottom of said screw into engagement with the said ratchet teeth, a spring member in said bore of the screw urging the pawl into contact with the ratchet teeth, an adjusting screw also threaded to the said internal thread and adapted for varying the pressure of said spring upon the pawl, and a lock nut also threaded to said internal thread and engageable with the said adjusting screw for locking it in adjusted position.

References Cited in the file of this patent

UNITED STATES PATENTS

| | | |
|---|---|---|
| 1,527,757 | Street | Feb. 24, 1925 |
| 2,491,325 | McVey | Dec. 13, 1949 |

FOREIGN PATENTS

| | | |
|---|---|---|
| 256,607 | Switzerland | Aug. 31, 1948 |